United States Patent [19]

Landau et al.

[11] 4,175,064

[45] Nov. 20, 1979

[54] ACCELERATOR SYSTEMS FOR THE PEROXIDE-CATALYZED CURING OF UNSATURATED POLYESTER RESIN COMPOSITIONS

[75] Inventors: Marvin Landau, North Bergen, N.J.; Samuel J. Bellettiere, New Hope, Pa.; Samuel Hoch, Brooklyn, N.Y.

[73] Assignee: Tenneco Chemicals, Inc., Saddle Brook, N.J.

[21] Appl. No.: 946,688

[22] Filed: Sep. 28, 1978

[51] Int. Cl.$^2$ .......................... B01J 31/12; C09D 3/68; C09F 9/00
[52] U.S. Cl. ................................ 260/22 CA; 106/264; 106/310; 252/431 C; 260/22 CB; 525/13
[58] Field of Search ............ 260/22 CA, 22 CB, 863; 106/264, 310; 252/431 C

[56] References Cited

U.S. PATENT DOCUMENTS

| | | | |
|---|---|---|---|
| 2,390,830 | 12/1945 | Elliott | 106/310 |
| 3,091,936 | 6/1963 | Lundberg et al. | 260/863 |
| 3,124,475 | 3/1964 | Fischer et al. | 106/264 |
| 3,166,431 | 1/1965 | Mullaly | 106/310 |
| 3,297,788 | 1/1967 | Dun et al. | 260/863 |
| 3,398,213 | 8/1968 | Chetakian | 260/863 |
| 3,644,612 | 2/1972 | Meyer et al. | 106/310 |
| 3,920,589 | 11/1975 | Jacobs et al. | 260/22 CA |
| 3,920,590 | 11/1975 | Jacobs et al. | 260/22 CA |

*Primary Examiner*—Ronald W. Griffin
*Attorney, Agent, or Firm*—Evelyn Berlow

[57] ABSTRACT

Accelerator systems that comprise cobalt and potassium salts of organic acids are used to accelerate the curing of peroxide-catalyzed unsaturated polyester resin compositions.

26 Claims, No Drawings

ACCELERATOR SYSTEMS FOR THE PEROXIDE-CATALYZED CURING OF UNSATURATED POLYESTER RESIN COMPOSITIONS

This invention relates to unsaturated polyester resin compositions that are capable of rapid curing at low temperatures and to a process for the curing of unsaturated polyester resin compositions. More particularly, it relates to a process for accelerating the curing of peroxide-catalyzed unsaturated polyester resin compositions by the use of an accelerator system that comprises cobalt and potassium salts of organic acids. It further relates to a metal salt composition that is an effective accelerator for the peroxide curing of unsaturated polyester resin compositions.

The unsaturated polyester resin compositions to which this invention applies are solutions of unsaturated polyester resins in a polymerizable monomer which provides cross-linking units to unite the polymer chains. The polyester and monomer copolymerize upon the introduction of a peroxide catalyst to form a rigid, insoluble, infusible material. These unsaturated polyester resin compositions have found widespread use in the production of coatings, laminates, cast articles, molded articles, and other shaped articles.

Accelerators are usually added to unsaturated polyester resin compositions to accelerate the decomposition of the peroxide catalyst to free radicals and thereby initiate or speed the curing of the composition at relatively low temperatures, i.e., at temperatures in the range of 0° to 30° C. Among the materials that have been reported as being effective accelerators are metal compounds, such as cobalt, manganese, iron, vanadium, copper, and aluminum salts of organic acids; amines, such as dimethylaniline, diethylaniline, and 2-aminopyridine; Lewis acids, such as boron fluoride dihydrate and ferric chloride; bases, such as tetraethanol ammonium hydroxide and tetramethyl ammonium hydroxide; quaternary ammonium salts, such as trimethylbenzyl ammonium chloride and tetrakismethylol phosphonium chhloride; and sulfur compounds, such as dodecyl mercaptan and 2-mercaptoethanol. Cobalt salts of organic acids are the most widely-used accelerators for the low temperature decomposition of peroxide catalysts and the curing of unsaturated polyester resin compositions.

The curing time of unsaturated polyester resin compositions at low temperatures can be further reduced by the use of a second accelerator in combination with the cobalt compounds or other accelerators. A number of co-accelerators that have been used in combination with a cobalt salt of an organic acid to promote the curing of unsaturated polyester resin compositions have been disclosed in the art. For example, U.S. Pat. No. 3,091,936, Lundberg et al. disclosed accelerators in which amines, such as dimethylaniline, diethylethanolamine, and tetramethylbutane diamine, were used in combination with cobalt naphthenate and other cobalt salts of organic acids. The use of aliphatic polyamines, such as diethylene triamine and 3,4-diamino-3,4-dimethylhexane, as the co-accelerator was disclosed by Meyer et al. in U.S. Pat. No. 3,644,612. Mullaly in U.S. Pat. No. 3,166,431 used a combination of cobalt naphthenate and a samarium salt to accelerate the peroxide-catalyzed curing of an unsaturated polyester resin composition. The use of these two-component accelerator systems results in rapid curing of unsaturated polyester resin compositions at low temperatures, but it often has an adverse effect on the color, clarity, and other physical properties of the cured compositions. In addition, these accelerator systems contain materials that are costly and/or not readily available commercially.

In accordance with this invention, it has been found that unsaturated polyester resin compositions can be cured rapidly and thoroughly at low temperatures by means of a peroxide catalyst and an accelerator system that comprises a cobalt salt of an organic acid and a potassium salt of an organic acid. The use of the novel accelerator system does not adversely affect the physical properties of the cured compositions or add to their cost. Because of the greater activity of the cobalt/potassium accelerator systems, their use provides shorter initial gel times and less gel time drift on aging than result when the same amount or a larger amount of the cobalt salt is used alone or in combination with another co-accelerator in the peroxide-catalyzed curing of unsaturated polyester resin compositions. The improvements in gel time and gel time drift that result when the cobalt/potassium salt accelerators are used in place of cobalt salt accelerators are unexpected in view of the fact that the potassium salts do not accelerate the curing of polyester resins when used alone.

The cobalt salts and the potassium salts that are used to accelerate the decomposition of the peroxide catalyst are derived from organic monocarboxylic acids that have from 6 to 24 carbon atoms. The useful acids include saturated and unsaturated aliphatic, aromatic, and alicyclic monocarboxylic acids, for example, hexanoic acid, heptanoic acid, 2-ethylhexanoic acid, octanoic acid, nonanoic acid, isononanoic acid, decanoic acid, isodecanoic acid, neodecanoic acid, lauric acid, myristic acid, stearic acid, arachidic acid, behenic acid, oleic acid, linoleic acid, erucic acid, benzoic acid, p-tert.-butybenzoic acid, salicylic acid, ricinoleic acid, α-hydroxystearic acid, monobutyl maleate, monodecyl phthalate, cyclopentanoic acid, cyclohexanoic acid, cycloheptanoic acid, and methylcyclohexanoic acid. It is generally preferred that cobalt and potassium salts of aliphatic monocarboxylic acids having 8 to 12 carbon atoms or alicyclic acids having 5 to 7 carbon atoms be present in the accelerator systems. The cobalt salt and the potassium salt may be derived from the same organic acid or from different organic acids.

The cobalt and potassium salts are added to the unsaturated polyester resin compositions as solutions in organic solvents. Solutions of the cobalt and potassium salts may be added separately, or a solution that contains both cobalt and potassium salts may be added to the unsaturated polyester resin composition.

The amounts of the accelerator systems that are used are those that will provide from 0.001% to 0.1% of cobalt (as the metal) and from 0.001% to 0.1% of potassium (as the metal), and preferably from 0.01% to 0.05% of cobalt and from 0.01% to 0.05% of potassium, based on the weight of the unsaturated polyester resin composition.

In a preferred embodiment of the invention, the accelerator system is added to the unsaturated polyester resin composition as a solution of the cobalt and potassium salts in a solvent in which both salts are soluble. Suitable solvents include mixtures that contain from 20% to 80% by weight of a polar solvent and from 20% to 80% by weight of a non-polar solvent, for example, a mixture of an alkanol having 3 to 20 carbon atoms and a hydrocarbon having 5 to 20 carbon atoms. The preferred solvents for the cobalt and potassium salts contain from 40% to 60% by weight of an alkanol having 6 to 12 carbon atoms and 40% to 60% by weight of an aliphatic or cycloaliphatic hydrocarbon. Particularly good results have been obtained using as solvent a mixture that contained 40% to 60% by weight of an alkanol having 8 to 10 carbon atoms, for example, n-octanol, 2-ethylhexanol, n-decanol, isodecanol, or 2-ethyloctanol, and 40% to 60% by weight of mineral spirits.

These accelerator systems can be prepared by mixing together amounts of solutions of the cobalt and potassium salts in organic salts that will form a solution that contains from 1% to 10% by weight of cobalt (as the metal) and from 1% to 10% by weight of potassium (as the metal) and that has a total metal content of from 5% to 12% by weight. The cobalt salt is usually added as a cobalt salt solution that contains 4% to 20% by weight, preferably 6% by weight of cobalt, and the potassium salt is usually added as a potassium salt solution that contains 5% to 24% by weight, preferably 10% by weight of potassium. The accelerator systems preferably contain from 2% to 4% by weight of cobalt and from 4% to 6% by weight of potassium and have a total metal content of about 8% by weight. Particularly good results have been obtained when the accelerator system was prepared by mixing together equal weights of a cobalt salt solution in mineral spirits that contained 6% cobalt and a potassium salt solution in isodecanol that contained 10% potassium to form an accelerator system that contained 3% cobalt and 5% potassium.

From 0.1% to 3% by weight, preferably 0.25% to 2% by weight of the accelerator system is used to provide the amounts of cobalt and potassium that are required to accelerate the decomposition of the peroxide catalyst.

Alternatively, the accelerator systems can be formed by dissolving the metal salts separately in an appropriate organic solvent or by dissolving a salt of one of the metals in a solution in an organic solvent of a salt of the other metal.

The infrared, visible, and proton magnetic resonance spectra of solutions that contain varying amounts of the cobalt and potassium salts indicate that in solution two moles of the potassium salt combines with one mole of the cobalt salt to form a novel compound whose structure is not now known. The visible absorption spectrum of this 2/1 potassium/cobalt compound has a peak maximum at 555 $\mu m$ and a molar absorptivity of 128, whereas that of the cobalt salt from which it was prepared has a peak maximum at 562 $\mu m$ and a molar absorptivity (cobalt basis) of 40. The enhanced activity of the accelerator systems of this invention probably arises from the presence in them of this novel potassium salt/cobalt compound.

In addition to the cobalt salt/potassium salt compound, the accelerator systems may contain cobalt salts of organic monocarboxylic acids and/or potassium salts of these acids.

In another preferred embodiment of the invention, a solution of the cobalt salt of one of the aforementioned monocarboxylic acids and a solution of the potassium salt of one of said acids are added separately to the polyester resin compositions. The cobalt salt is usually added as a solution in mineral spirits that contains 4% to 20% by weight, preferably 6% by weight of cobalt, and the potassium salt is usually added as a solution in an alkanol having 3 to 20 carbon atoms that contains 5% to 24% by weight, preferably 10% by weight of potassium.

In addition to their use as accelerator systems for the peroxide-catalyzed curing of unsaturated polyester resin compositions, the cobalt salt/potassium salt combinations of this invention have been found useful in promoting the cure of other unsaturated polymers, such as alkyd resins and drying oils, which are used in the coatings industry.

The polyester resins that are used in the practice of this invention are unsaturated polyester resins that for formed by condensing a saturated dicarboxylic acid or anhydride and an unsaturated dicarboxylic acid or anhydride with a dihydric alcohol. Illustrative of these polyester resins are the products of the reaction of a saturated dicarboxylic acid or anhydride, such as phthalic anhydride, isophthalic acid, tetrahydrophthalic anhydride, hexahydrophthalic anhydride, endomethylene tetrahydrophthalic anhydride, tetrachlorophthalic anhydride, hexachloroendomethylene tetrahydrophthalic acid, succinic acid, glutaric acid, adipic acid pimelic acid, suberic acid, azelaic acid, and sebacic acid, and an unsaturated dicarboxylic acid or anhydride, such as maleic anhydride, fumaric acid, chloromaleic acid, itaconic acid, citraconic acid, and mesaconic acid, with a dihydric alcohol, such as ethylene glycol, propylene glycol, butylene glycol, diethylene glycol, triethylene glycol, and neopentyl glycol. Small amounts of a polyhydric alcohol, such as glycerol, pentaerythritol, trimethylolpropane, or sorbitol, may be used in combination with the glycol.

A three-dimensional structure is produced by reacting the unsaturated polyester through the unsaturated acid component with an unsaturated monomer that is capable of reacting with the polyester resin to form cross-linkages. Suitable unsaturated monomers include styrene, methylstyrene, dimethylstyrene, vinyltoluene, divinylbenzene, dichlorostyrene, methyl acrylate, ethyl acrylate, methyl methacrylate, diallyl phthalate, vinyl acetate, triallyl cyanurate, acrylonitrile, acrylamide, and mixtures thereof. The relative amounts of the unsaturated polyester resin and the unsaturated monomer in the composition may be varied over a wide range.

The unsaturated polyester resin compositions generally contain 20% to 80% by weight of the monomer, with the monomer content preferably in the range of 30% to 70% by weight.

An organic peroxide that decomposes to release free radicals at temperatures in the range of 0° to 30° C. is used to catalyze the copolymerization reaction between the unsaturated polyester resin and the unsaturated monomer. Among the peroxide catalysts that can be used are methyl ethyl ketone peroxide, benzoyl peroxide, cumene hydroperoxide, cetyl peroxide, lauroyl peroxide, cyclohexanone peroxide, 2,4-dichlorobenzoyl peroxide, bis(p-bromobenzoyl)peroxide, acetyl peroxide, and di-tert.-butyl diperphthalate. The peroxide catalysts that are most commonly used are methyl ethyl ketone peroxide, benzoyl peroxide, and cumene hydroperoxide. The amount of peroxide catalyst used is from 0.1% to 1.1% and preferably from 0.6% to 1.0% of the wieght of the unsaturated polyester resin composition.

In addition to the unsaturated polyester resin, cross-linking monomer, peroxide catalyst, and one of the accelerator systems of this invention, the unsaturated polyester resin compositions may also contain an inhibitor, such as tert.butyl-catechol or hydroquinone, fillers and pigments, dyes, mold release agents, plasticizers, stabilizers, flame-retardants, and other additives in the amounts ordinarily used for these purposes.

The unsaturated polyester resin compositions that comprise an unsaturated polyester resin, an unsaturated monomer, a peroxide catalyst, and an accelerator system that contains a cobalt salt and a potassium salt cure rapidly without application of heat to form rigid, insoluble, and infusible products.

The invention is further illustrated by the following examples.

EXAMPLE 1

A series of unsaturated polyester resin compositions was prepared by the following procedure:

Portions of a 30% styrenated polyester resin (Polyester Resin USS MR 941, U.S. Steel Corp.) were mixed with varying amounts of the accelerator systems of this invention or a comparative accelerator.

Fifty gram portions of the styrenated polyester resin-accelerator system mixtures in four ounce jars were placed in a constant temperature bath that was maintained at 27° C. To each portion was added 0.45 cc of a 60% solution of methyl ethyl ketone peroxide in dimethyl phthalate (Lupersol DDM, Wallace & Tiernan, Inc.). The time required for the unsaturated polyester resin composition to gel was measured using a Mol-Rez Gel Time Meter.

The gelation test was repeated after the styrenated polyester resin-accelerator system mixtures had aged for periods ranging from several days to several weeks.

The following accelerator systems were used in these tests:

A. Cobalt octanoate solution in mineral spirits having a distillation range of 157°–192° C. (6% Co)
   Potassium octanoate solution in isodecanol (10% K)
   These solutions were added separately to the styrenated polyester resin in amounts that provided 0.02% by weight of cobalt (as metal) and 0.02% by weight of potassium (as metal) based on the weight of the styrenated polyester resin.

B. Cobalt octanoate solution in mineral spirits (6% Co)
   Potassium octanoate solution in isodecanol (10% K)
   These solutions were added separately to the styrenated polyester resin in amounts that provided 0.01% by weight of cobalt (as metal) and 0.03% by weight of potassium (as metal).

C. Equal weights of a cobalt octanoate solution in mineral spirits (6% Co) and a potassium octanoate solution in isodecanol (10% K) were mixed to form an accelerator system that contained 3% Co and 5% K (as metals).
   An amount of this mixture that provided 0.04% by weight of metal (cobalt and potassium) was added to the styrenated polyester resin.

D. As comparative accelerator, a solution of cobalt octanoate in mineral spirits that contained 6% Co was used in an amount that provided 0.04% by weight of cobalt.

E. As comparative accelerator, a solution of potassium octanoate in isodecanol that contained 10% K was used in an amount that provided 0.04% by weight of potassium.

The results obtained in the gelation tests are summarized in Table I.

Table I

| Example No. | 1A | 1B | 1C | Comp. Ex. 1 | Comp. Ex. 2 |
|---|---|---|---|---|---|
| Accelerator System Used | A | B | C | D | E |
| Amt. of Metal Added (based on wt. of composition) | 0.02% Co 0.02% K | 0.01% Co 0.03% K | 0.04% Co & K as blend | 0.04% Co | 0.04% K |
| Gelation Time (Minutes) | | | | | |
| Initial | 16 | 24 | 19 | 22 | >60 |
| After 4 Days | 24 | 32 | 27 | 40 | >60 |
| After 1 Week | 25 | 33 | 27 | 43 | >60 |
| After 2 Weeks | 30 | 43 | 31 | 54 | >60 |
| After 3 Weeks | 35 | 46 | 36 | 62 | >60 |
| After 4 Weeks | 35 | 48 | 36 | 57 | >60 |

EXAMPLE 2

The procedure described in Example 1 was repeated except that the styrenated polyester resin used was Polyester Resin USS-16019 (U.S. Steel Corp.).

The accelerator systems used were those described in Example 1 as Accelerator Systems A, C, and D as well as the following:

F. The blend of equal weights of a cobalt octanoate solution and a potassium octanoate solution that was described as Accelerator System C was used in an amount that provided 0.03% by weight of metal (cobalt and potassium).

G. The blend of equal weights of a cobalt octanoate solution and a potassium octanoate solution that was described as Accelerator System C was used in an amount that provided 0.02% by weight of metal (cobalt and potassium).

The results obtained in the gelation tests are summarized in Table II.

Table II

| Example No. | 2A | 2B | 2C | 2D | Comp. Ex. 3 |
|---|---|---|---|---|---|
| Accelerator System Used | A | C | F | G | D |
| Amount of Metal Added (based on wt. of composition) | 0.02% Co 0.02% K | 0.04% Co & K as blend | 0.03% Co & K as blend | 0.02% Co & K as blend | 0.04% Co |
| Gelation Time | | | | | |

Table II-continued

| Example No. | 2A | 2B | 2C | 2D | Comp. Ex. 3 |
|---|---|---|---|---|---|
| (Minutes) | | | | | |
| Initial | 9 | 9 | 14 | 19 | 16 |
| After 1 Week | 13 | 12 | 21 | 33 | 26 |
| After 2 Weeks | 15 | 13 | 22 | 32 | 37 |
| After 3 Weeks | 14 | 13 | 20 | — | 43 |

EXAMPLE 3

The procedure described in Example 1 was repeated except that the 30% styrenated polyester resin used was Stypol 40-0811, Freeman Chemical Corp.

The accelerator systems used were those described in Examples 1 and 2 as Accelerator Systems A, C, D, E, and F.

The results obtained in the gelation tests are summarized in Table III.

Table III

| Example No. | 3A | 3B | 3C | Comp. Ex. 4 | Comp. Ex. 5 |
|---|---|---|---|---|---|
| Accelerator System Used | A | C | F | D | E |
| Amount of Metal Added (based on wt. of composition) | 0.02% Co 0.02% K | 0.04% Co & K as blend | 0.03% Co & K as blend | 0.04% Co | 0.04% K |
| Gelation Time (Minutes) | | | | | |
| Initial | 5 | 5 | 7 | 6 | >60 |
| After 2 Days | 6 | 6 | 8 | 7 | >60 |
| After 1 Week | 4 | 5 | 5 | 5 | >60 |
| After 2 Weeks | 5 | 5 | 7 | 6 | >60 |

From the data in Tables I, II, and III, it will be seen that the accelerator systems of this invention, which contained combinations of cobalt and potassium, provided more rapid curing of the unsaturated polyester resin composition and less gel time drift than did the comparative accelerator, which contained only cobalt, even when a smaller amount of cobalt was present. Particularly good results were obtained when the accelerator system was a stable solution that contained 3% of cobalt and 5% of potassium (as metals).

What is claimed is:

1. In the process for the curing of an unsaturated polyester resin composition that comprises contacting a composition comprising an unsaturated polyester resin and an unsaturated monomer capable of reacting with said unsaturated polyester resin to form cross-linkages with an organic peroxide catalyst and an accelerator system, the improvements wherein the accelerator system comprises at least one cobalt salt and at least one potassium salt of monocarboxylic acids selected from the group consisting of aliphatic, aromatic, and alicyclic monocarboxylic acids having 6 to 24 carbon atoms and the accelerator system is present in an amount that will provide from 0.001% to 0.1% of cobalt (as metal) and 0.001% to 0.1% of potassium (as metal), based on the weight of the unsaturated polyester resin composition.

2. The process of claim 1 wherein the accelerator system is present in an amount that will provide from 0.01% to 0.05% of cobalt (as metal) and from 0.01% to 0.05% of potassium (as metal), based on the weight of the unsaturated polyester resin composition.

3. The process of claim 1 wherein a solution of the cobalt salt in an organic solvent and a solution of potassium salt in an organic solvent are added separately to the unsaturated polyester resin composition.

4. The process of claim 1 wherein the accelerator system comprises cobalt and potassium salts of a monocarboxylic acid selected from the group consisting of aliphatic acids having 8 to 12 carbon atoms and alicyclic acids having 5 to 7 carbon atoms.

5. The process of claim 1 wherein the cobalt salt and the potassium salt are added to the unsaturated polyester resin composition as a solution of the cobalt salt and the potassium salt in an organic solvent, said solution having a total metal content of from 5% to 10% by weight.

6. The process of claim 3 wherein the accelerator system is a solution of cobalt and potassium salts that contains from 1% to 10% by weight of cobalt (as metal) and from 1% to 10% by weight of potassium (as metal).

7. The process of claim 3 wherein the accelerator system is a solution of cobalt and potassium salts that contains from 2% to 4% by weight of cobalt (as metal) and from 4% to 6% by weight of potassium (as metal) and that has a total metal content of about 8% by weight.

8. The process of claim 3 wherein from 0.1% to 3% by weight of the accelerator system is incorporated in the unsaturated polyester resin composition.

9. The process of claim 3 wherein from 0.25% to 2% by weight of the accelerator system is incorporated in the unsaturated polyester resin composition.

10. The process of claim 3 wherein the accelerator system is a solution of cobalt and potassium salts in an organic solvent that contains 20% to 80% by weight of a polar solvent and 20% to 80% by weight of a non-polar solvent.

11. The process of claim 3 wherein the accelerator system is a solution of cobalt and potassium salts in an organic solvent that contains 40% to 60% by weight of an alkanol having 3 to 20 carbon atoms and 40% to 60% by weight of a hydrocarbon having 5 to 20 carbon atoms.

12. The process of claim 3 wherein the accelerator system is a solution of cobalt octanoate and potassium octanoate in an organic solvent that contains 40% to 60% by weight of an alkanol having 8 to 10 carbon atoms and 40% to 60% by weight of mineral spirits.

13. An unsaturated polyester resin composition that comprises
(a) an unsaturated polyester resin;
(b) an unsaturated monomer capable of reacting with the unsaturated polyester resin to form cross-linkages;
(c) an organic peroxide catalyst; and
(d) an accelerator system that comprises at least one cobalt salt and at least one potassium salt of monocarboxylic acids selected from the group consisting of aliphatic, aromatic, and alicyclic monocarboxylic acids having 6 to 24 carbon atoms,
said accelerator system being present in an amount that will provide from 0.001% to 0.1% of cobalt (as metal) and from 0.001% to 0.1% of potassium (as metal), based on the total weight of the unsaturated polyester resin and the unsaturated monomer.

14. An unsaturated polyester resin composition as defined in claim 13 wherein the accelerator system is present in an amount that will provide from 0.01% to 0.05% of cobalt (as metal) and from 0.01% to 0.05% of potassium (as metal), based on the total weight of the unsaturated polyester resin and the unsaturated monomer.

15. An unsaturated polyester resin composition as defined in claim 13 that contains 20% to 80% by weight of the unsaturated polyester resin and 20% to 80% by weight of the unsaturated monomer.

16. An unsaturated polyester resin composition as defined in claim 13 that contains 30% to 70% by weight of the unsaturated polyester resin and 30% to 70% by weight of the unsaturated monomer.

17. An unsaturated polyester resin composition as defined in claim 13 wherein the unsaturated monomer is styrene.

18. An unsaturated polyester resin composition as defined in claim 13 wherein the peroxide catalyst is methyl ethyl ketone peroxide.

19. An unsaturated polyester resin composition as defined in claim 13 wherein the accelerator system comprises cobalt salts and potassium salts of monocarboxylic acids selected from the group consisting of aliphatic acids having 8 to 12 carbon atoms and alicyclic acids having 5 to 7 carbon atoms.

20. An accelerator system for peroxide-catalyzed unsaturated polyester resin compositions that is a solution of metal compounds selected from the group consisting of cobalt salts of monocarboxylic acids having 6 to 24 carbon atoms, potassium salts of monocarboxylic acids having 6 to 24 carbon atoms, reaction products of said cobalt salts and said potassium salts, and mixtures thereof in an organic solvent mixture that contains from 20% to 80% by weight of a polar solvent and from 20% to 80% by weight of a non-polar solvent, said solution containing from 1% to 10% by weight of cobalt metal and from 1% to 10% by weight of potassium metal and having a total metal content of from 5% to 12% by weight.

21. An accelerator system as defined in claim 20 that is a solution of metal compounds selected from the group consisting of cobalt salts of monocarboxylic acids selected from the group consisting of aliphatic acids having 8 to 12 carbon atoms and alicyclic acids having 5 to 7 carbon atoms, potassium salts of said monocarboxylic acids, reaction products of said cobalt salts and said potassium salts, and mixtures thereof in an organic solvent mixture that contains from 40% to 60% by weight of an alkanol having 3 to 20 carbon atoms and from 40% to 60% by weight of a hydrocarbon having 5 to 20 carbon atoms, said solution containing from 2% to 4% by weight of cobalt metal and from 4% to 6% by weight of potassium metal and having a total metal content of about 8% by weight.

22. An accelerator system as defined in claim 21 that is a solution of a cobalt salt and a potassium salt in a solvent that contains from 40% to 60% by weight of an alkanol having 6 to 12 carbon atoms and 40% to 60% by weight of an aliphatic or cycloaliphatic hydrocarbon.

23. An accelerator system as defined in claim 21 that is a solution of cobalt octanoate and potassium octanoate in a solvent that contains 40% to 60% by weight of an alkanol having 8 to 10 carbon atoms and 40% to 60% by weight of mineral spirits, said solution containing 3% by weight of cobalt metal and 5% by weight of potassium metal.

24. The compound that is the product of the reaction of one mole of a cobalt salt of a monocarboxylic acid having from 6 to 24 carbon atoms with two moles of a potassium salt of a monocarboxylic acid having from 6 to 24 carbon atoms in an organic solvent that contains 20% to 80% by weight of an alkanol having 3 to 20 carbon atoms and 20% to 80% by weight of a hydrocarbon having 5 to 20 carbon atoms.

25. The compound defined in claim 24 that is the product of the reaction of one mole of a cobalt salt of a monocarboxylic acid selected from the group consisting of aliphatic acids having 8 to 12 carbon atoms and alicyclic acids having 5 to 7 carbon atoms with two moles of a potassium salt of said monocarboxylic acids in an organic solvent that contains 40% to 60% by weight of an alkanol having 6 to 12 carbon atoms and 40% to 60% by weight of an aliphatic or cycloaliphatic hydrocarbon.

26. The compound defined in claim 24 that is the product of the reaction of one mole of cobalt octanoate with two moles of potassium octanoate in a solvent that contains 40% to 60% by weight of an alkanol having 8 to 10 carbon atoms and 40% to 60% by weight of mineral spirits.

* * * * *

UNITED STATES PATENT AND TRADEMARK OFFICE

CERTIFICATE OF CORRECTION

PATENT NO. : 4,175,064
DATED : Nov. 20, 1979
INVENTOR(S) : Marvin Landau et al.

It is certified that error appears in the above-identified patent and that said Letters Patent are hereby corrected as shown below:

Column 1, line 56, before "U.S." insert -- in --;

Column 3, line 55, after "cobalt" insert -- salt --;

Column 4, line 11, change "for" to -- are --;

Column 4, line 62, change "wieght" to -- weight --.

Signed and Sealed this

Twelfth Day of February 1980

[SEAL]

Attest:

SIDNEY A. DIAMOND

Attesting Officer

Commissioner of Patents and Trademarks

UNITED STATES PATENT OFFICE
CERTIFICATE OF CORRECTION

PATENT NO. : 4,175,064
DATED : November 20, 1979
INVENTOR(S) : MARVIN LANDAU ET AL It is certified that error appears in the above-identified patent and that said Letters Patent are hereby corrected as shown below:

Column 2, line 33 - change "octanoic" to - - n-octanoic - -

Column 5, lines 50, 52, 58 and 59; Column 6, lines 5, 6, 14, 18, 48, 49, 53 and 54 - after "octanoate" insert (2-ethyl hexanoate)

Signed and Sealed this

Fourth Day of November 1980

[SEAL]

*Attest:*

*Attesting Officer*

SIDNEY A. DIAMOND

*Commissioner of Patents and Trademarks*